June 12, 1956 H. C. GOODRICH 2,750,452

SELECTIVITY CONTROL CIRCUIT

Filed March 21, 1951

INVENTOR
Hunter C. Goodrich
BY H. [signature]
ATTORNEY

United States Patent Office 2,750,452

Patented June 12, 1956

2,750,452

SELECTIVITY CONTROL CIRCUIT

Hunter C. Goodrich, Collingswood, N. J., assignor to Radio Corporation of America, a corporation of Delaware Application March 21, 1951, Serial No. 216,765

10 Claims. (Cl. 179—171)

This invention relates generally to control systems, and particularly relates to electric circuits for controlling or altering the Q of a resonant circuit to provide, for example, a variable selectivity amplifier system.

The Q of a resonant circuit such as a parallel resonant circuit may be defined as the energy stored by the circuit divided by the energy dissipated by the circuit during each cycle of an oscillatory wave. Expressed mathematically, $Q=\omega L/R$, wherein $\omega$ is the angular velocity of the wave, L the inductance of the inductor of the circuit, and R its resistance. The Q of a resonant circuit also determines the band width, that is, the pass band of the circuit. Thus, if $f$ is the resonant frequency of a parallel resonant circuit and $\Delta f$ is its band width between the points corresponding to one half the voltage at the resonance peak, then $Q=1.72f/\Delta f$.

In accordance with the present invention a transistor is utilized for altering, varying or controlling the Q of a resonant circuit. A transistor is a semi-conductor device consisting of a semi-conducting crystal and an emitter, a collector and a base in contact with the crystal. It has been found that the resistance which appears between the emitter and base of a transistor may be varied and may even be caused to become negative. Thus, in accordance with the present invention, the Q of a resonant circuit may be controlled by means of a transistor. The Q of a parallel resonant circuit may be increased appreciably over its normal value or it may be controlled to control the pass band of an amplifier system. In the latter case, a variable selectivity control may be achieved which may find use in a broadcast receiver.

It is, accordingly, the principal object of the present invention to provide an improved control system for effectively utilizing a transistor to alter, vary or control the Q of a resonant circuit.

A further object of the present invention is to provide a signal or carrier wave amplifier system wherein the improved control characteristics of a transistor are effectively utilized to control the selectivity of the amplifier system in response to variations in the average amplitude of a received signal or carrier wave.

Another object of the invention is to provide an improved control circuit arrangement including a transistor, for increasing or decreasing at will the normal Q of a resonant circuit by a substantial amount.

In accordance with the present invention, the inductor of a resonant circuit, such as a parallel resonant circuit, is connected in series between the emitter and base electrodes of a transistor. Preferably only a portion of the inductor is connected in the emitter-base path of the transistor. The operating voltages applied to the transistor are now adjusted or varied whereby the effective resistance which appears between the emitter and base of the transistor is adjusted or varied. This in turn will alter the Q of the resonant circuit connected to the transistor.

The resonant circuit may, for example, be the output circuit of an amplifier system. In that case, the selectivity of the amplifier system may be controlled by controlling the pass band of the resonant circuit. Alternatively, a carrier wave to be amplified may be impressed on the resonant circuit and the amplified output signal may be derived from the collector electrode of the transistor. In this case, the transistor functions both as an amplifier and as a control means for the Q of the resonant circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
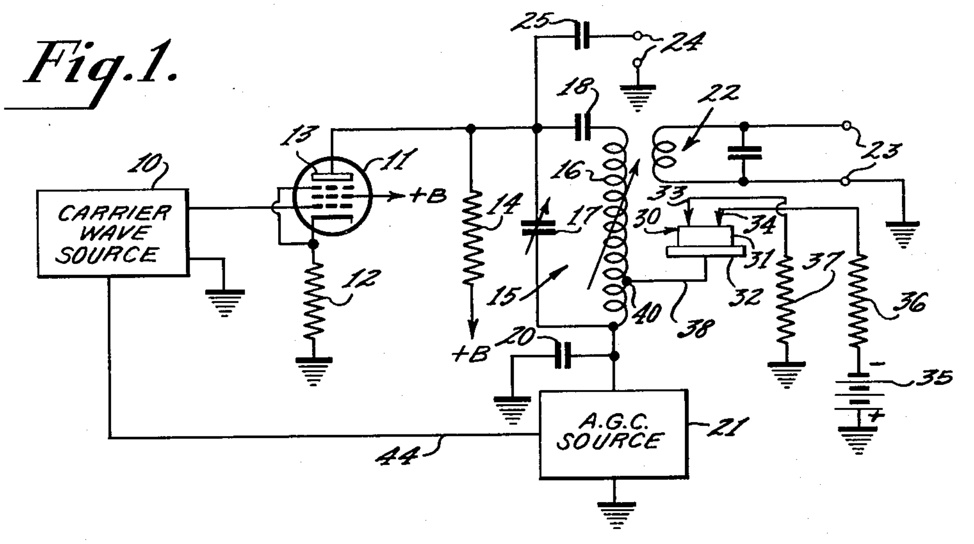
Figure 1 is a circuit diagram of an amplifier system wherein the selectivity of a resonant circuit is controlled by a transistor in accordance with the present invention.

Referring now to the drawing, wherein like components are designated by the same reference numerals, and particularly to Figure 1, there is illustrated an amplifier system comprising a carrier wave source 10. The carrier wave developed by source 10 may have its amplitude or its frequency modulated in accordance with a modulation signal. The carrier wave developed by source 10 is impressed on amplifier tube 11, which may, for example, be a vacuum tube of the pentode type as illustrated. The carrier wave is impressed between grid and ground, and the cathode is connected to ground through a cathode resistor 12 for developing a bias voltage. The anode 13 is connected to a suitable source of anode voltage indicated at +B through anode resistor 14. Anode resistor 14 preferably has a high resistance in order not to load the parallel resonant circuit 15, which is also connected to anode 13.

Parallel resonant circuit 15 includes an inductor 16 and a capacitor 17 connected in parallel. Either the inductor 16 or the capacitor 17 may be variable, as shown, to adjust the resonant frequency of circuit 15. A blocking capacitor 18 is provided between the upper terminal of inductor 16 and anode 13. The lower terminal of resonant circuit 15 is grounded for alternating-frequency currents by capacitor 20. Furthermore, the lower terminal of resonant circuit 15 is grounded for direct currents through a source 21 of variable voltage which may be an automatic gain control (AGC) source, the purpose of which will be explained hereinafter.

The amplifier system as described so far is entirely conventional. The output signal may be derived, for example, from parallel resonant output circuit 22 inductively coupled to resonant circuit 15. The output signal may be obtained from output terminals 23 connected to the terminals of resonant circuit 22, one of which may be grounded. Alternatively, the output signal may be obtained from output terminals 24, one of which is grounded while the other one is coupled to anode 13 by blocking capacitor 25.

In accordance with the present invention, the Q of resonant circuit 15 is altered or varied. To this end, there is provided a semi-conductor device 30 such as a transistor which includes a semi-conducting body 31. Body 31 may for example, consist of silicon or germanium as is well known. Base electrode 32, emitter electrode 33 and collector electrode 34 are in contact with body 31.

Base 32 is in low-resistance contact with body 31 and usually is a large-area electrode. Emitter 33 and collector 34 are in rectifying contact with body 31 and may, for example, consist of point electrodes.

A voltage in the reverse direction is impressed between collector 34 and base 32. If body 31 is of the N type, the collector should be negative with respect to the base. Accordingly a source of voltage such as battery 35 has its positive terminal grounded while its negative terminal is connected to collector 34 through collector resistor 36. Emitter 33 may be grounded through emitter resistor 37. By means of lead 38 a tap 40 on inductor 16 is connected to base electrode 32 so that a negative voltage is applied by source 21 to base 32. Consequently, a voltage in the forward direction is applied between emitter 33 and base 32 because emitter 33 is positive with respect to base 32 as required for an N type crystal.

Voltage source 21, the lower portion of inductor 16, base 32, emitter 33, and emitter resistor 37 are connected in series. Thus, the base-emitter path of the transistor is connected in series with source 21 and a portion of inductor 16.

Figure 2:
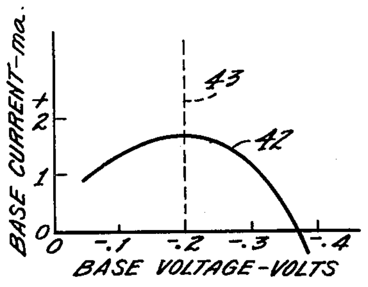
Figure 2 is a graph illustrating the relationship between the base current and the base voltage of the transistor included in the amplifier system of Figure 1.

As shown by curve 42 of Figure 2 the base current indicated milliamperes (ma.) is a function of the base voltage. As the base voltage becomes increasingly more negative, the base current first increases and then decreases again. The effective base resistance is given by the slope of curve 42 and it will be seen that the portion of curve 42 to the left of the dotted line 43 represents a negative resistance, and the remainder of the portion of curve 42 to the right of dotted line 43 represents a positive resistance. It will, accordingly, be seen that by increasing the base voltage in a negative direction, the base resistance is first made negative, then approaches infinity and eventually becomes positive.

Hence, the base resistance may be controlled by the base voltage or by a change of the base current. Both the base voltage and the base current in turn depend on the collector voltage so that the base resistance may be changed by changing any of the voltages applied to the electrodes of transistor 30 or by changing any of the currents flowing through the electrodes.

Accordingly, a change of the voltage developed by source 21 will vary the base voltage and, therefore, the base resistance which is effectively connected in parallel with inductor 16 or a portion thereof. Source 21 may be made responsive to the average amplitude of the carrier wave developed by source 10 as indicated schematically by lead 44 connecting sources 10 and 21. Such an AGC source is conventionally included in a broadcast receiver. Thus, for a carrier wave of high amplitude or a strong input signal the pass band determined by the selectivity of resonant circuit 15 should be made wide. On the other hand, for a weak input signal, that is, for a carrier wave of small amplitude, the selectivity should be made narrow, that is, the voltage developed by source 21 should be less negative.

Amplifier 11 preferably is a pentode as shown which has a high anode resistance and, therefore, has less shunting effect on resonant circuit 15. The same applies to resistor 14 which should also have a high resistance. Both collector resistor 36 and emitter resistor 37 are not essential for the operation of the circuit of the invention and may, therefore, be omitted. However, emitter resistor 37 stabilizes the operation of the transistor. It introduces a certain amount of degeneration. The same applies to collector resistor 36 which may also be omitted. The circuit is further stabilized by connecting base 32 to an intermediate tap 40 on inductor 16. The stabilization is due to the fact that the operating point of the transistor just before oscillation is at a lower and less critical value of the negative base resistance as shown clearly by curve 42.

It is, of course, feasible to provide manual control of the Q of resonant circuit 15 by substituting a battery of adjustable voltage for source 21.

By way of example, a parallel resonant circuit 15 was used in the circuit of Figure 1 which resonates at a frequency of 1000 kc. (kilocycles) and has a normal Q of 100. The effective Q of the resonant circuit 15 could be increased by transistor 30 to a value of 750. This value was determined by dividing the voltage developed across resonant circuit 15 by the input voltage of the circuit. Furthermore, the band width of the circuit between the half voltage points was 2.3 kc. Accordingly, $$Q=1.72f/\Delta f=1.72\times 1000/2.3=750$$

The control system of Figure 1 accordingly raises the gain of the amplifier system and avoids coupling losses; it also increases the selectivity.

Figure 3:
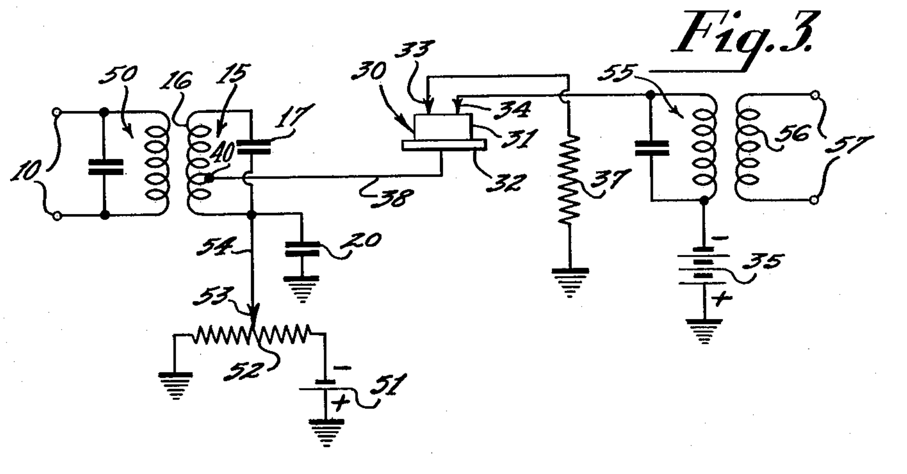
Figure 3 is a circuit diagram of a semi-conductor amplifier circuit wherein the pass band of the amplifier circuit may be adjusted in accordance with the invention.

The amplifier circuit of Figure 3, to which reference is now made, utilizes the transistor both as an amplifier and as a device for controlling the Q of the resonant circuit 15. A carrier wave to be amplified is impressed on input terminals 10 across which resonant input circuit 50 is connected. Resonant input circuit 50 is inductively coupled to parallel resonant circuit 15. Tap 40 on inductor 16 is again connected to base 32 by lead 38. The lower terminal of resonant circuit 15 is grounded for alternating frequency currents by capacitor 20. An adjustable voltage may be applied through resonant circuit 15 to base electrode 32. To this end there may be provided a battery 51 having its positive terminal grounded. Potentiometer resistor 52 is connected across battery 51 and an adjustable voltage may be obtained from tap 53 connected by lead 54 to inductor 16.

Emitter 33 may again be grounded through emitter resistor 37. The negative terminal of collector battery 35 is connected to collector 34 through parallel resonant circuit 55 and the output signal may be obtained from output coil 56 inductively coupled to resonant circuit 55. The output signal may be obtained from output terminals 57 connected across inductor 56.

The circuit of Figure 3 operates as a conventional transistor amplifier where the carrier wave is impressed on the base and the amplified output signal is derived from the collector. By moving tap 53 in accordance with the present invention the Q of resonant circuit 15 may be adjusted or altered. Consequently, the Q of resonant circuit 15 may be raised or lowered which, in turn, will raise or lower the pass band or the selectivity of the amplifier circuit. It is to be understood that battery 51 and potentiometer 52 may be substituted for the source 21 in Figure 1. In view of the previous explanations, the operation of the control system of Figure 3 will now be evident.

There has thus been disclosed a control system including a transistor for controlling or adjusting the Q of a resonant circuit. The resonant circuit may be the output circuit of a separate amplifier or, alternatively, the transistor may be used both for controlling the Q of a resonant circuit and for amplifying a wave impressed on the resonant circuit. The control system of the invention may be adapted for controlling the selectivity of a broadcast receiver.

What is claimed is:

1. In combination, a resonant signal circuit, a semiconductor device having a semi-conducting body, a base electrode, an emitter electrode, and a collector electrode in contact with said body, means providing a source of control voltage connected in series with said resonant circuit, means connecting said resonant circuit and said last named means in series in the order named between said base electrode and a point of reference potential, means for varying said control voltage to vary the effective resistance between said emitter and base electrodes and the Q of said resonant circuit, means connecting said emitter electrode to said point of reference potential, and means providing a source of biasing potential connected between said collector electrode and said point of reference potential for applying biasing potentials to said collector electrode.

2. In combination, a semi-conductor device having a semi-conducting body, a base electrode, an emitter electrode, and a collector electrode in contact with said body, an impedance element connected between said emitter electrode and a point of reference potential, a parallel resonant circuit connected with said base electrode, means providing a source of control voltage connected in series between said resonant circuit and said point of reference potential, means for adjusting said control voltage to vary the effective resistance between said emitter and base electrodes for altering the Q of said resonant circuit, and means connecting said collector electrode with said point of reference potential including a source of biasing potential for applying biasing potentials to said collector electrode.

3. A control system comprising a resonant circuit having an inductor, a semi-conductor device having a semi-conducting body, a base electrode, an emitter electrode, and a collector electrode in contact with said body, means for applying a voltage in the reverse direction between said collector and base electrodes, a source of control voltage connected in series with at least a portion of said inductor between said base electrode and a point of reference potential, means for varying said control voltage to vary the effective resistance between said emitter and base electrodes and the Q of said resonant circuit, and direct current conductive means connecting said emitter and collector electrodes to said point of reference potential.

4. A system for controlling the Q of a resonant circuit comprising, a parallel resonant circuit having an inductor, a semi-conductor device having a semi-conducting body, a base electrode, an emitter electrode, and a collector electrode in contact with said body, means for applying a voltage in the reverse direction between said collector and base electrodes, a resistor connected between said emitter electrode and a point of reference potential, a source of control voltage connected in series with at least a portion of said inductor between said base electrode and said point of reference potential, an impedance element serially connected between said collector electrode and said point of reference potential, and means for varying said control voltage to vary the effective resistance between said emitter and base electrodes and the Q of said resonant circuit.

5. A variable selectivity amplifier system comprising an amplifier, means for impressing a carrier wave on said amplifier, a parallel resonant output circuit coupled to said amplifier and having an inductor, a semi-conductor device having a semi-conducting body, a base electrode, an emitter electrode and a collector electrode in contact with said body, means for applying a voltage in the reverse direction between said collector and base electrodes, means connecting said emitter electrode to a point of reference potential in said circuit, and a source of variable control voltage connected in series with at least a portion of said inductor between said base electrode and said point of fixed reference potential, whereby the selectivity of said amplifier system is varied in response to variations of said control voltage.

6. A variable selectivity amplifier system comprising an amplifier, means for impressing a carrier wave on said amplifier, a parallel resonant output circuit coupled to said amplifier and having an inductor, a semi-conductor device having a semi-conducting body, a base electrode, an emitter electrode and a collector electrode in contact with said body, means for applying a voltage in the reverse direction between said collector and base electrodes, a resistor connected between said emitter electrode and a point of fixed reference potential, and a source of variable control voltage connected in series with at least a portion of said inductor between said base electrode and said point of fixed reference potential, whereby the selectivity of said amplifier system is varied in response to variations of said control voltage.

7. A variable selectivity amplifier system comprising an amplifier, means for impressing a carrier wave on said amplifier, a parallel resonant output circuit coupled to said amplifier and having an inductor, a semi-conductor device having a semi-conducting body, a base electrode, an emitter electrode and a collector electrode in contact with said body, means for applying a voltage in the reverse direction between said collector and base electrodes, an impedance element serially connected between said collector electrode and a point of fixed reference potential, a resistor connected between said emitter electrode and said point of fixed reference potential, and a source of variable control voltage connected in series with at least a portion of said inductor between said base electrode and said point of fixed reference potential, whereby the selectivity of said amplifier system is varied in response to variations of said control voltage.

8. A band pass signal amplifier system comprising a semi-conductor device having a semi-conductor body, a base electrode, an emitter electrode, and a collector electrode in contact with said body, means for applying a voltage in the reverse direction between said collector and base electrodes, means connecting said emitter electrode to a point of reference potential in said system, a parallel resonant input circuit including an inductor, means providing a variable source of voltage, at least a portion of said inductor and said source of voltage being connected serially between said base electrode and said point of reference potential, a parallel resonant output circuit connected in circuit between said collector electrode and said point of reference potential, means for impressing a signal wave on said input circuit, means for deriving an amplified signal wave from said output circuit, and means for adjusting said source of voltage to vary the voltage which is applied between said emitter and base electrodes and to adjust the pass band of said amplifier system.

9. A band pass amplifier system comprising a semi-conductor device having a semi-conducting body, a base electrode, an emitter electrode, and a collector electrode in contact with said body, means for applying a voltage in the reverse direction between said collector and base electrodes, a parallel resonant input circuit including an inductor, a resistor connected between said emitter electrode and a point of reference potential, means providing a variable source of voltage, at least a portion of said inductor and said source of voltage being connected serially between said base electrode and said point of fixed reference potential, a parallel resonant output circuit connected between said collector electrode and said point of reference potential, means for impressing a carrier wave on said input circuit, means for deriving an amplified carrier wave from said output circuit, and means for adjusting said source of voltage to vary the voltage which is applied between said emitter and base electrodes and to adjust the pass band of said amplifier system.

10. A band pass amplifier system comprising a semi-conductor device having a semi-conducting body, a base electrode, an emitter electrode, and a collector electrode in contact with said body, means for applying a voltage in the reverse direction between said collector and base electrodes, a parallel resonant input circuit including an inductor, a source of voltage, a resistor connected between said emitter electrode and a point of fixed reference potential, at least a portion of said inductor and said source of voltage being connected serially between said base electrode and said point of fixed reference potential, a parallel resonant output circuit connected between said collector electrode and said point of fixed reference potential, means for impressing a carrier wave on said input circuit, means for deriving an amplified carrier wave from said output circuit, and means for adjusting said source of voltage to vary the voltage which is applied between said emitter and base electrodes and to adjust the pass band of said amplifier system.

References Cited in the file of this patent

UNITED STATES PATENTS

| | | |
|---|---|---|
| 2,142,038 | Bier | Dec. 27, 1938 |
| 2,255,690 | Wheeler | Sept. 9, 1941 |
| 2,262,707 | Farrington | Nov. 11, 1941 |
| 2,323,598 | Hathaway | July 6, 1943 |
| 2,524,035 | Bardeen et al. | Oct. 3, 1950 |
| 2,544,211 | Barton | Mar. 6, 1951 |
| 2,585,078 | Barney | Feb. 12, 1952 |
| 2,644,859 | Barton | July 7, 1953 |
| 2,647,957 | Mallinckrodt | Aug. 4, 1953 |